(12) United States Patent
Riediger-Janisch et al.

(10) Patent No.: US 11,174,953 B2
(45) Date of Patent: Nov. 16, 2021

(54) RELAY VALVE FOR A COMPRESSED-AIR SYSTEM

(71) Applicant: WABCO GmbH, Hannover (DE)

(72) Inventors: Karl-Heinz Riediger-Janisch, Hannover (DE); Reiner Hölscher, Seelze (DE); Gerhard Martini, Gehrden (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 16/979,203

(22) PCT Filed: Mar. 20, 2019

(86) PCT No.: PCT/EP2019/056949
§ 371 (c)(1),
(2) Date: Sep. 9, 2020

(87) PCT Pub. No.: WO2019/180075
PCT Pub. Date: Sep. 26, 2019

(65) Prior Publication Data
US 2021/0054855 A1 Feb. 25, 2021

(30) Foreign Application Priority Data
Mar. 23, 2018 (DE) .................. 10 2018 106 975.8

(51) Int. Cl.
*F15B 11/068* (2006.01)
*F16K 11/04* (2006.01)

(52) U.S. Cl.
CPC ........... *F16K 11/04* (2013.01); *F15B 11/068* (2013.01)

(58) Field of Classification Search
CPC .............................. F15B 11/068; F16K 11/04
See application file for complete search history.

(56) References Cited

U.S. PATENT DOCUMENTS 10,723,338 B2 * 7/2020 Adamski et al. ..... B60T 15/027

FOREIGN PATENT DOCUMENTS

| DE | 3931761 A1 | 4/1991 |
| DE | 4136244 A1 | 5/1993 |
| DE | 102006017503 A1 | 10/2007 |
| DE | 102014016771 A1 | 5/2016 |

OTHER PUBLICATIONS

European Patent Office, Rijswijk, Netherlands, International Search Report of International Application No. PCT/EP2019/056949, dated Jun. 26, 2019, 2 pages.

* cited by examiner

*Primary Examiner* — Kevin L Lee
(74) *Attorney, Agent, or Firm* — Dickinson Wright PLLC

(57) ABSTRACT

A relay valve (1') for a compressed-air system of a vehicle has a working pressure inlet, a working pressure outlet, a venting outlet and a controllable relay piston (19). The relay piston (19) is axially movably guided and, at one axial end, has an annular, radially inner valve seat (20). A sealing piston (9) is axially movably guided coaxially with respect to the relay piston (19). The sealing piston (9) is pushed by a compression spring (8) toward the relay piston (19) and an annular, radially outer valve seat (25), which is a part of a seat ring (24) fastened in an annular collar (23) of the housing bottom part (2). The seat ring (24) is a deep-drawn component shaped as a cylindrical pot of a metallic material. The radially outer valve seat (25) is an axially protruding annular web with a gable-shaped axial cross section.

10 Claims, 3 Drawing Sheets

RELAY VALVE FOR A COMPRESSED-AIR SYSTEM

TECHNICAL FIELD

The invention relates to a relay valve for a compressed-air system of a vehicle, which has a working pressure inlet, a working pressure outlet, a venting outlet and a controllable relay piston, wherein the relay piston is axially movably guided in a housing top part and, at one axial end, has an annular, radially inner valve seat, wherein there is provided a sealing piston, which is axially movably guided in a housing bottom part coaxially with respect to the relay piston, wherein the sealing piston is pushed by a compression spring in the direction of the relay piston and of an annular, radially outer valve seat, and in which the radially outer valve seat is a constituent part of a seat ring fastened in an annular collar of the housing bottom part.

BACKGROUND

Road vehicles, in particular heavy commercial vehicles, and rail vehicles are normally equipped with a compressed-air supply system by which compressed-air consumer circuits, such as service brake circuits, a parking brake circuit, an air suspension circuit, a ride-height control circuit and/or auxiliary consumer circuits, are supplied with compressed air. In order to modulate the working pressure of compressed-air consumers, for example of wheel brake cylinders of a service brake circuit, with relatively little control energy, use is normally made of relay valves. A relay valve has a working pressure inlet, which is connected to a compressed-air source, a working pressure outlet, to which at least one compressed-air consumer is connected, and a venting outlet, which leads into the surroundings.

In the presently considered construction, the relay valve is provided with a controllable relay piston and a sealing piston. The relay piston is axially movably guided in a housing top part and has an annular, radially inner valve seat. The sealing piston is axially movably guided in a housing bottom part coaxially with respect to the relay piston and is pushed by a compression spring in the direction of the relay piston and of an annular, radially outer valve seat. The radially outer valve seat is a constituent part of a seat ring which is fastened in a sealed manner in an annular collar of the housing bottom part. In a manner dependent on the position of the relay piston and the sealing piston, the working pressure outlet is, in an alternating manner, connected to the working pressure inlet or the venting outlet or blocked off with respect to these. If the relay piston bears with the inner valve seat against the sealing piston, and the sealing piston has lifted off from the outer valve seat, the working pressure outlet is connected to the working pressure inlet, whereby the working pressure which is active at the compressed-air consumer is increased. If the relay piston has, with its inner valve seat, lifted off from the sealing piston, and the sealing piston bears against the outer valve seat, the working pressure outlet is connected to the venting outlet, whereby the working pressure which is active at the compressed-air consumer is lowered. If the relay piston bears with its inner valve seat against the sealing piston, and the sealing piston simultaneously bears against the outer valve seat, the working pressure outlet is blocked off with respect to the working pressure inlet and the venting outlet, with the result that the working pressure which is active at the compressed-air consumer is then held constant.

DE 10 2006 017 503 A1 has disclosed a relay valve of the type, in which the relay piston is pneumatically adjustable in that a control pressure chamber delimited by the latter can, via at least one solenoid control valve, be alternately subjected to a high control pressure or vented.

DE 10 2014 016 771 A1 has disclosed a further relay valve of the type, in which the relay piston is electromagnetically adjustable in that an electromagnet, which is arranged coaxially with respect to the relay piston and whose armature is connected to the relay piston, can be acted on by a control current which is variable in terms of its magnitude and polarity.

What is common to both relay valves mentioned above is that the radially outer valve seat for the sealing piston is a constituent part of a seat ring, the seat ring being in the form of a turned part, consisting preferably of aluminum, and being inserted into an annular collar of the housing bottom part so as to be sealed off by an O-ring and being axially fixed there by means of a locking ring inserted into an annular groove.

SUMMARY

Since the manufacture of the seat ring with the radially outer valve seat as a turned part and the fixing thereof in the annular collar of the housing bottom part by means of a locking ring are relatively cumbersome, it is the object of the present invention to propose a seat ring which is provided with the radially outer valve seat of the sealing piston and which is able to be manufactured and fitted in an easier and less expensive manner.

The invention accordingly proceeds from a relay valve for a compressed-air system of a vehicle, which has a working pressure inlet, a working pressure outlet, a venting outlet and a controllable relay piston, wherein the relay piston is axially movably guided in a housing top part and, at one axial end, has an annular, radially inner valve seat, wherein there is provided a sealing piston, which is axially movably guided in a housing bottom part coaxially with respect to the relay piston, wherein the sealing piston is pushed by a compression spring in the direction of the relay piston and of an annular, radially outer valve seat, and in which the radially outer valve seat is a constituent part of a seat ring fastened in an annular collar of the housing bottom part. In order to achieve the stated object, it is provided for this relay valve that the seat ring is a deep-drawn component in the form of a cylindrical pot that is composed of a metallic material, and that the radially outer valve seat for the sealing piston is in the form of an axially protruding annular web with a gable-shaped axial cross section.

The seat ring is preferably manufactured from a steel sheet or from an aluminum sheet. In order to achieve sufficient dimensional stability and also a certain degree of resilient elasticity, the wall thickness of the seat ring lies in the range from 0.5 mm to 0.8 mm, with the region boundaries included.

For its axial positioning, the seat ring according to the invention may have an axially protruding annular abutment web which is formed radially at the outside and, in the fitted state, bears against an annular abutment collar within the annular collar of the housing bottom part.

The abutment web of the seat ring is preferably in the form of an annular web which has a gable-shaped cross section and which is incorporated into the seat ring by way of embossing.

For its axial fixing, the seat ring preferably has, at its radial outer edge, spring tongues which are arranged in a circumferentially distributed manner and which, in the fitted state, engage behind a radially inwardly directed annular web which is formed at the axial outer edge of the annular collar of the housing bottom part. In this way, the formation of a locking groove by milling from the housing bottom part at the outer edge of the annular collar and the insertion of a locking ring into such a locking groove are avoided, whereby the fitting of the seat ring is simplified.

The spring tongues may be easily formed by a circumferentially distributed arrangement of axial separating slots at the outer edge of the seat ring, wherein the separating slots are produced for example by way of punching-out of the seat ring.

In order to avoid sealing by means of a sealing ring, the seat ring, for its sealing, may have, at its outer circumference, at least one radially protruding annular seal web which, in the fitted state, by way of a radial oversize, bears resiliently elastically against a cylindrical sealing surface of the housing bottom part in a sealing manner. The seal web of the seat ring is preferably in the form of an annular web which has a gable-shaped cross section and which is incorporated into the seat ring by way of embossing.

BRIEF DESCRIPTION OF THE DRAWINGS

The invention will be discussed in more detail below on the basis of two exemplary embodiments illustrated in the appended drawing, in which.

DETAILED DESCRIPTION OF THE DRAWINGS

Figure 3:
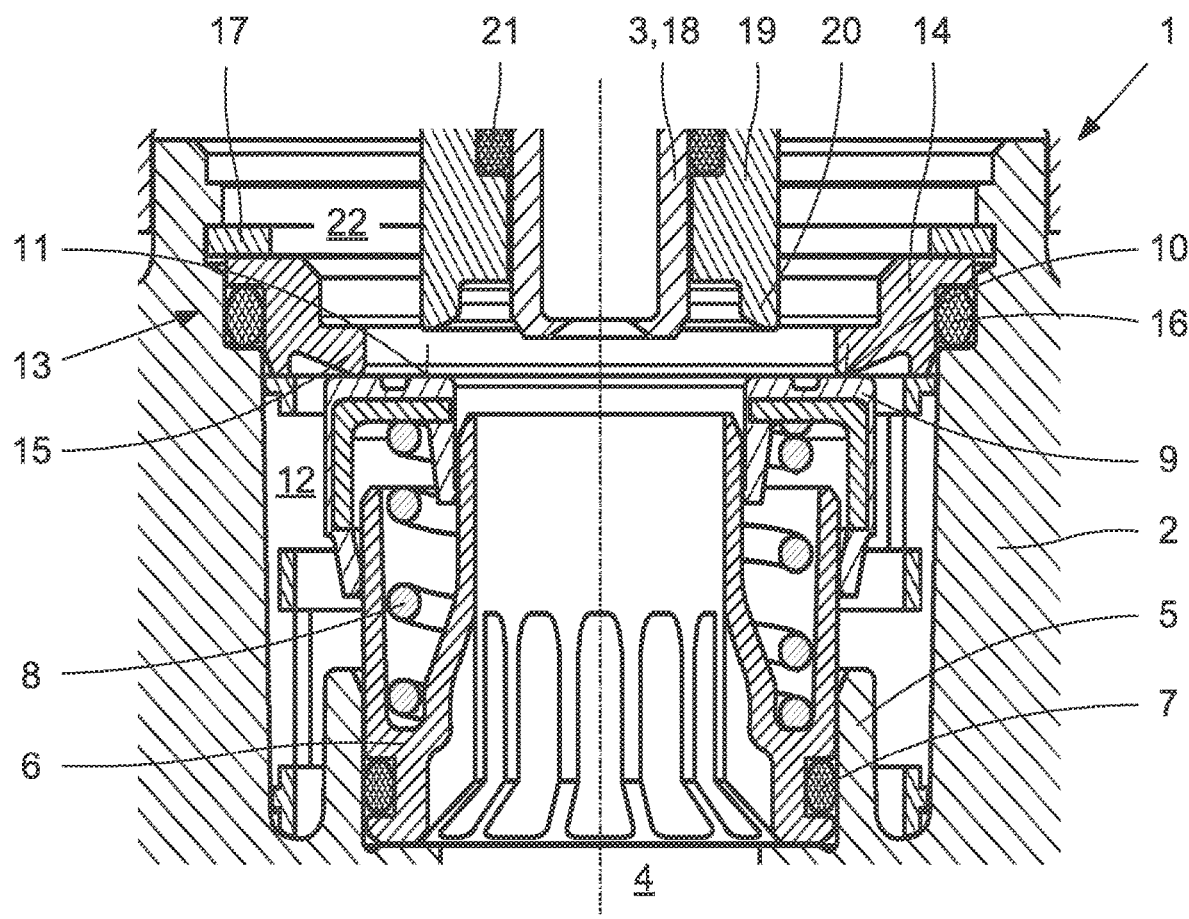
FIG. 3 shows a known relay valve with a hitherto conventional embodiment of a seat ring in a detail axial central section.

FIG. 3 illustrates a hitherto conventional relay valve 1 for a compressed-air system of a vehicle. The construction of the relay valve corresponds largely to that relay valve of the relay valves known from DE 10 2006 017 503 A1 and DE 10 2014 016 771 A1. With regard to the basic construction and the functioning of such relay valves, reference is also made to DE 41 36 244 A1, in which this is described in detail. The present description is therefore restricted to the components which are relevant to the invention.

The relay valve 1 has a housing bottom part 2, which is in the form of a cylindrical pot, and a cover-like housing top part 3, which is connected to the housing bottom part. The housing bottom part 2 has a central exit opening 4 which leads to a venting outlet. Above the exit opening 4, a double-cylindrical guide body 6 is inserted into a receiving part 5, in the form of a cylindrical pot, of the housing bottom part 2 so as to be sealed off via a first O-ring 7. A sealing piston 9 is axially movably mounted and guided on that end of the guide body 6 which is remote from the exit opening. The sealing body 9 is loaded by a spring force in the direction of the housing top part 3 by a compression spring 8 which is inserted into the guide body 6 and which is in the form of a helical spring. On its top side, which faces the housing top part 3, the sealing piston 9 has, radially at the outside, an annular disk-shaped first sealing surface 10 and, radially at the inside, an annular disk-shaped second sealing surface 11. An annular space 12 which is connected to a working pressure inlet of the relay valve is situated coaxially around the guide body 6 and the sealing piston 9.

Above the sealing piston 9, a seat ring 14 is inserted into an annular collar 13 of the housing bottom part 2 so as to be sealed off via a second O-ring 16 and to be axially fixed by means of a locking ring 17. On its bottom side, which faces the sealing piston 9, the seat ring 14 has an outer valve seat 15, which is in the form of an axially protruding annular web and interacts with the first, radially outer sealing surface 10 of the sealing piston 9. The seat ring 14 is produced as a turned part from steel or aluminum. A controllable relay piston 19 is axially movably guided on a central guide cylinder 18 of the housing top part 3 and, by means of a third O-ring 21, is sealed off with respect to the housing top part 3. The relay piston 19 is electromagnetically or pneumatically actuatable, that is to say axially displaceable. On its bottom side, which faces the sealing piston 9, the relay piston 19 has a radially inner valve seat 20, which is in the form of an axially protruding annular web and interacts with the second, radially inner sealing surface 11 of the sealing piston 9. A central space 22 which is connected to a working pressure outlet is situated between the sealing piston 9 and the relay piston 19.

If the relay piston 19 bears with its valve seat 20 against the second, radially inner sealing surface 11 of the sealing piston 9, and the sealing piston 9 has, with its first, radially outer sealing surface 10, lifted off from the valve seat 15 of the seat ring 14, the working pressure outlet is connected to the working pressure inlet of the relay valve 1, whereby the working pressure which is active at a compressed-air consumer connected to the working pressure outlet is increased. If, as illustrated in FIG. 3, the relay piston 19 has, with its valve seat 20, lifted off from the second, radially inner sealing surface 11 of the sealing piston 9, and the sealing piston 9 bears with the first, radially outer sealing surface 10 against the valve seat 15 of the seat ring 14, the working pressure outlet is connected to the venting outlet, whereby the working pressure which is active at the compressed-air consumer is lowered. If the relay piston 19 bears with its valve seat 20 against the second, radially inner sealing surface 11 of the sealing piston 9, and the sealing piston 9 simultaneously bears with the first, radially outer sealing surface 10 against the outer valve seat 15 of the seat ring 14, then the working pressure outlet is blocked off with respect to the working pressure inlet and the venting outlet, with the result that the working pressure which is active at the compressed-air consumer is then held constant.

Figure 1:
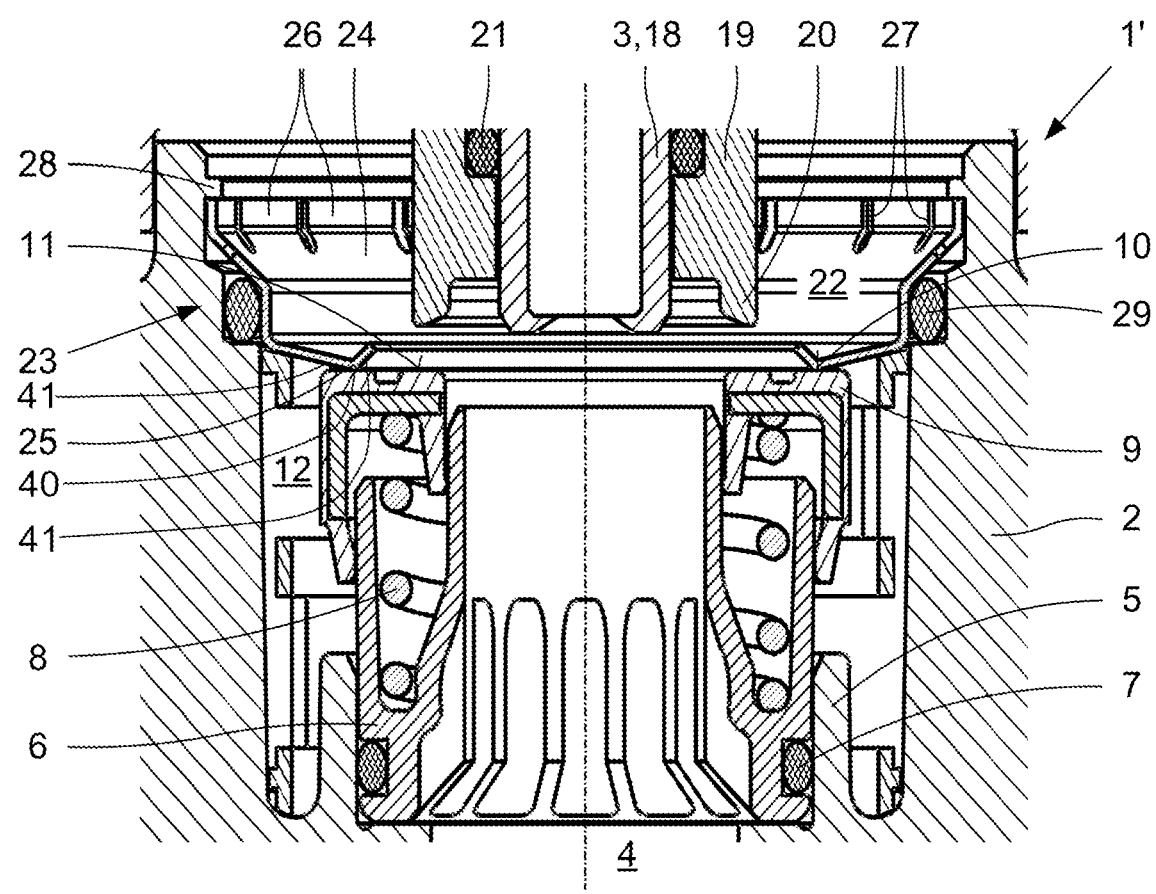
FIG. 1 shows a relay valve according to the invention with a first embodiment of a seat ring in a detail axial central section.

A first embodiment according to the invention of a relay valve 1', which is shown in FIG. 1, differs from the known embodiment of the relay valve 1 as per FIG. 3 while maintaining the same function in that the seat ring 24 is then produced as a deep-drawn component in the form of a cylindrical pot from a steel sheet or an aluminum sheet. The valve seat 25 for the sealing piston 9 that is formed on the seat ring 24 is in the form of an axially protruding annular web which has a gable-shaped cross section, i.e. a ridge 40 bordered by two sloped surfaces 41, and which is incorporated into the seat ring 24 by way of embossing.

The seat ring 24 is inserted into an annular collar 23 of the housing bottom part 2. For its axial fixing, the seat ring 24 has, at its radial outer edge, spring tongues 26 which are formed in a circumferentially distributed manner and which, in the fitted state, engage behind a radially inwardly directed annular web 28 which is formed at the axial outer edge of the annular collar 23. The spring tongues 26 are formed by a circumferentially distributed formation of axial separating slots 27 at the outer edge of the seat ring 24, which separating slots are produced by way of punching-out of the seat ring 24. For sealing between the seat ring 24 and the housing bottom part 2, an O-ring 29 is inserted into the annular collar 23 of the housing bottom part 2.

Figure 2:
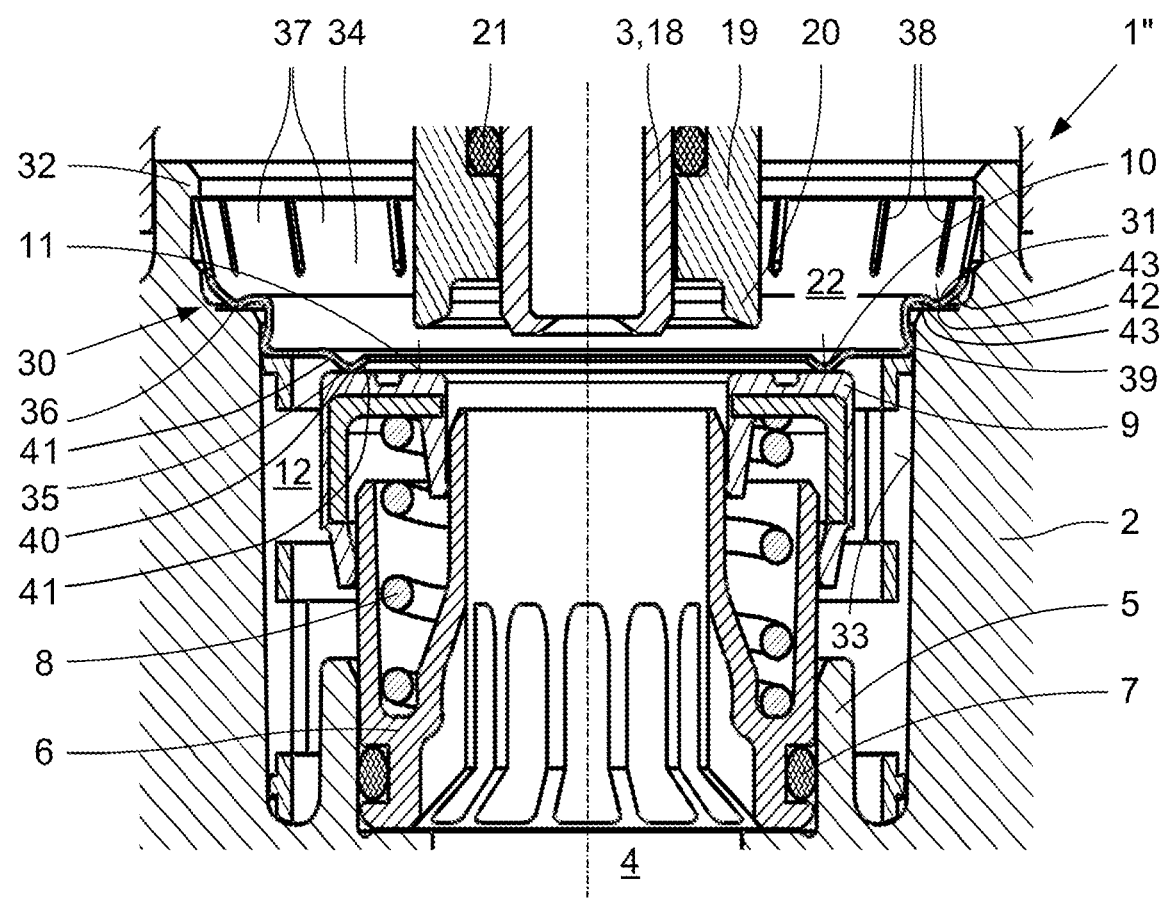
FIG. 2 shows a relay valve according to the invention with a second embodiment of a seat ring in a detail axial central section.

A second embodiment according to the invention of a relay valve 1", which is shown in FIG. 2, likewise differs from the known embodiment of the relay valve 1 as per FIG. 3 while maintaining the same function in that the seat ring 34 is produced as a deep-drawn component in the form of a cylindrical pot from a steel sheet or an aluminum sheet. The radially outer valve seat 35 for the sealing piston 9 is again in the form of an axially protruding annular web which has a gable-shaped cross section and which is incorporated into the seat ring 34 by way of embossing.

The seat ring 34 is inserted into an annular collar 30 of the housing bottom part 2. For its axial positioning, the seat ring 34 has, radially at the outside, an axially protruding annular abutment web 36 which, in the fitted state, bears against an annular abutment collar 31 at the radial inner edge of the annular collar 30. The abutment web 36 of the seat ring 34 is in the form of an annular web which has a gable-shaped cross section, i.e. a ridge 42 bordered by two sloped surfaces 43, and which is incorporated into the seat ring 34 by way of embossing. For its axial fixing, the seat ring 34 has, at its radial outer edge, spring tongues 37 which are arranged in a circumferentially distributed manner and which, in the fitted state, engage behind a radially inwardly directed annular web 32 which is formed at the axial outer edge of the annular collar 30. The spring tongues 37 are formed by a circumferentially distributed formation of axial separating slots 38 at the outer edge of the seat ring 34, which separating slots are produced by way of punching-out of the seat ring 34.

For sealing between the seat ring 34 and the housing bottom part 2, the seat ring 34 has, radially at the inside at its outer circumference, a radially protruding annular seal web 39 which, in the fitted state, by way of a radial oversize, bears resiliently elastically against a cylindrical sealing surface 33 of the housing bottom part 2. The seal web 39 of the seat ring 34 is in the form of an annular web which has a gable-shaped cross section and which is incorporated into the seat ring 34 by way of embossing.

The embodiment as a deep-drawn component composed of sheet metal as per FIGS. 1 and 2 results in the production of the seat ring 24, 34 being significantly simplified, and correspondingly less expensive, in comparison with an embodiment of the seat ring 14 as a turned part as per FIG. 3. Also, the fixing of the seat ring 24, 34 by means of spring tongues 26, 37, which in each case engage behind an annular web 28, 32 at the outer edge of the annular collar 23, 30, as per FIGS. 1 and 2 results in the fitting of the seat ring 24, 34 being simplified in comparison with the fixing of the seat ring 14 by means of a locking ring 17, which is inserted into an annular groove, as per FIG. 3. Also, the embodiment of the seat ring 34 with a seal web 39 as per FIG. 2 results in the saving of an O-ring 16, 29 in comparison with the other embodiments of the seat ring 14, 24 as per FIGS. 1 and 3, whereby the fitting of the relay valve 1" is further simplified.

The invention claimed is:

1. A relay valve (1', 1") for a compressed-air system of a vehicle, comprising:
   a working pressure inlet,
   a working pressure outlet,
   a venting outlet and
   a controllable relay piston (19),
   wherein the controllable relay piston (19) is axially movably guided in a housing top part (3) and, at one axial end, has an annular, radially inner valve seat (20),
   wherein a sealing piston (9) is axially movably guided in a housing bottom part (2) coaxially with respect to the controllable relay piston (19),
   wherein the sealing piston (9) is pushed by a compression spring (8) toward the controllable relay piston (19) and toward an annular, radially outer valve seat (25, 35), the radially outer valve seat (25, 35) a part of a seat ring (24, 34) fastened in an annular collar (23, 30) of the housing bottom part (2),
   wherein the seat ring (24, 34) is a deep-drawn component shaped as a cylindrical pot composed of a metallic material, and the radially outer valve seat (25, 35) for the sealing piston (9) is an axially protruding annular web with a gable-shaped axial cross section.

2. The relay valve as claimed in claim 1, wherein the radially outer valve seat (25, 35) for the sealing piston (9) is embossed into the seat ring (24, 34).

3. The relay valve as claimed in claim 1, wherein the wall thickness of the seat ring (24, 34) is within the range of 0.5 mm through 0.8 mm.

4. The relay valve as claimed in claim 1, wherein, for axial positioning, the seat ring (34) has, at a radially outer periphery, an axially protruding annular abutment web (36) which, in a fitted state, bears against an annular abutment collar (31) within the annular collar (30) of the housing bottom part (2).

5. The relay valve as claimed in claim 4, wherein the abutment web (36) of the seat ring (34) is an annular web, which has a gable-shaped cross section and is embossed into the seat ring (34).

6. The relay valve as claimed in claim 1, wherein, for axial fixing in the housing bottom part (2), the seat ring (24, 34) has a radially outer edge with spring tongues (26, 37) arranged in a circumferentially distributed manner, which, in a fitted state, reach behind a radially inwardly directed annular web (28, 32) formed at an axial outer edge of the annular collar (23, 30) of the housing bottom part (2).

7. The relay valve as claimed in claim 6, wherein the spring tongues (26, 37) are formed by a circumferentially distributed arrangement of axial separating slots (27, 38) at the radially outer edge of the seat ring (24, 34), and in that the separating slots (27, 38) are punched out of the seat ring (24, 34).

8. The relay valve as claimed in claim 1, wherein the seat ring (34) has an outer circumference with at least one radially protruding annular seal web (39) which, in a fitted state, by way of a radial oversize, bears resiliently elastically against a cylindrical sealing surface (33) of the housing bottom part (2) in a sealing manner.

9. The relay valve as claimed in claim 8, wherein the seal web (39) of the seat ring (34) is an annular web which has a gable-shaped cross section and is embossed into the seat ring (34).

10. The relay valve as claimed in claim 8, wherein the seal web (39) is formed at a radially outer periphery at an axial end of the seat ring (34) proximate to the sealing piston.

\* \* \* \* \*